(12) United States Patent
Yu et al.

(10) Patent No.: US 7,101,069 B2
(45) Date of Patent: Sep. 5, 2006

(54) DIRECT BACKLIGHT MODULE

(75) Inventors: Chuan-Pei Yu, Ilan (TW); Han-Chou Liu, Hsinchu (TW); Chin-Kun Hsieh, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 219 days.

(21) Appl. No.: 10/613,493

(22) Filed: Jul. 2, 2003

(65) Prior Publication Data

US 2004/0012763 A1 Jan. 22, 2004

(30) Foreign Application Priority Data

Jul. 19, 2002 (TW) .............................. 91116115 A

(51) Int. Cl.
*F21V 7/00* (2006.01)
*F21V 21/00* (2006.01)

(52) U.S. Cl. .................. 362/558; 362/560; 362/225; 362/260; 362/581

(58) Field of Classification Search ................ 362/558, 362/560, 224, 225, 339, 249, 260, 581, 614, 362/634
See application file for complete search history.

(56) References Cited

U.S. PATENT DOCUMENTS

| 4,826,294 | A | 5/1989 | Imoto | 349/67 |
|---|---|---|---|---|
| 5,138,528 | A * | 8/1992 | Altman et al. | 361/760 |
| 5,567,042 | A * | 10/1996 | Farchmin et al. | 362/241 |
| RE36,961 | E * | 11/2000 | Nagano | 362/219 |
| 6,561,663 | B1 * | 5/2003 | Adachi et al. | 362/31 |
| 6,700,554 | B1 | 3/2004 | Ham et al. | 345/75.2 |
| 6,734,926 | B1 | 5/2004 | Fan et al. | 349/58 |
| 6,747,404 | B1 | 6/2004 | Rha | 313/491 |
| 2002/0044437 | A1 * | 4/2002 | Lee | 362/31 |
| 2002/0113924 | A1 | 8/2002 | Saito et al. | 349/112 |
| 2003/0086255 | A1 * | 5/2003 | Moon et al. | 362/97 |
| 2004/0012971 | A1 | 1/2004 | Tsai et al. | 362/390 |

FOREIGN PATENT DOCUMENTS

| JP | 05119313 A |   | 5/1993 |   |
| JP | 07-072476 | * | 3/1995 | 362/634 |
| JP | 2001-210126 | * | 8/2001 | 362/634 |

* cited by examiner

*Primary Examiner*—Stephen Husar
*Assistant Examiner*—Peggy A. Neils
(74) *Attorney, Agent, or Firm*—Ladas & Parry LLP

(57) ABSTRACT

A direct backlight module. The direct backlight module includes a diffuser, a reflecting plate, an illumination tube and a support. The reflecting plate is disposed under the diffuser. The illumination tube is disposed between the diffuser and the reflecting plate. The support is disposed on the reflecting plate and between the diffuser and the reflecting plate. In addition, the support has a fitting portion into which the illumination tube directly fits. The support supports the diffuser and the illumination tube simultaneously.

18 Claims, 6 Drawing Sheets

DIRECT BACKLIGHT MODULE

BACKGROUND OF THE INVENTION

1. Field of the Invention

The present invention relates to a direct backlight module, and in particular to a direct backlight module supporting the diffuser and illumination tubes simultaneously to overcome bending of the diffuser and illumination tubes due to thermal expansion and contraction and insufficient rigidity thereof.

2. Description of the Related Art

FIG. 1 is a cross section showing a conventional direct backlight module 1. The conventional direct backlight module 1 includes a diffuser 11, a reflecting plate 12, a prism 17, a diffusing plate 18, two supports 13 and a plurality of illumination tubes 14. The reflecting plate 12 is disposed under the diffuser 11. The prism 17 is disposed on the diffuser 11. The diffusing plate 18 is disposed on the prism 17. The supports 13 are disposed on the reflecting plate 12 and located between the diffuser 11 and the reflecting plate 12. The plural illumination tubes 14 are disposed between the diffuser 11 and the reflecting plate 12.

As shown in FIG. 1, in order to protect the diffuser 11 from bending, the supports 13 are disposed between the diffuser 11 and the reflecting plate 12 to support the diffuser 11. Thus, the optical character of the direct backlight module 1 is not deteriorated and even the illumination tubes 14 are not damaged by the bent diffuser 11. Nevertheless, when the size of the LCD panel 15 increases, the illumination tube 14 also becomes larger. Thus, the illumination tube 14 is bent and deformed due to its weight, deteriorating the optical character of the direct backlight module 1.

FIG. 2 is a cross section showing another conventional direct backlight module 2. In order to overcome the aforementioned deformation of the illumination tubes 14 of the direct backlight module 1, a support 23 is disposed under the illumination tube 22 of the direct backlight module 2. Nevertheless, as shown in FIG. 2, when the size of the LCD panel (not shown) increases, the diffuser 21 also becomes large. Thus, the diffuser 21 is bent and deformed, deteriorating the optical character of the direct backlight module 2.

Consequently, the invention provides a direct backlight module supporting the diffuser and the illumination tubes simultaneously. The diffuser and illumination tubes are not bent and deformed due to insufficient rigidity thereof even when the LCD panel or the diffuser is large. Further, the diffuser and the illumination tubes are not deformed due to thermal expansion and contraction even when the direct backlight module works for a long period of time. Thus, the optical character of the direct backlight module is not deteriorated.

SUMMARY OF THE INVENTION

An object of the invention is to provide a direct backlight module. The direct backlight module comprises a diffuser; a reflecting plate disposed under the diffuser; an illumination tube disposed between the diffuser and the reflecting plate; and a support disposed on the reflecting plate and between the diffuser and the reflecting plate for supporting the diffuser and the illumination tube simultaneously, wherein the support has a fitting portion into which the illumination tube directly fits.

A detailed description will be given by the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
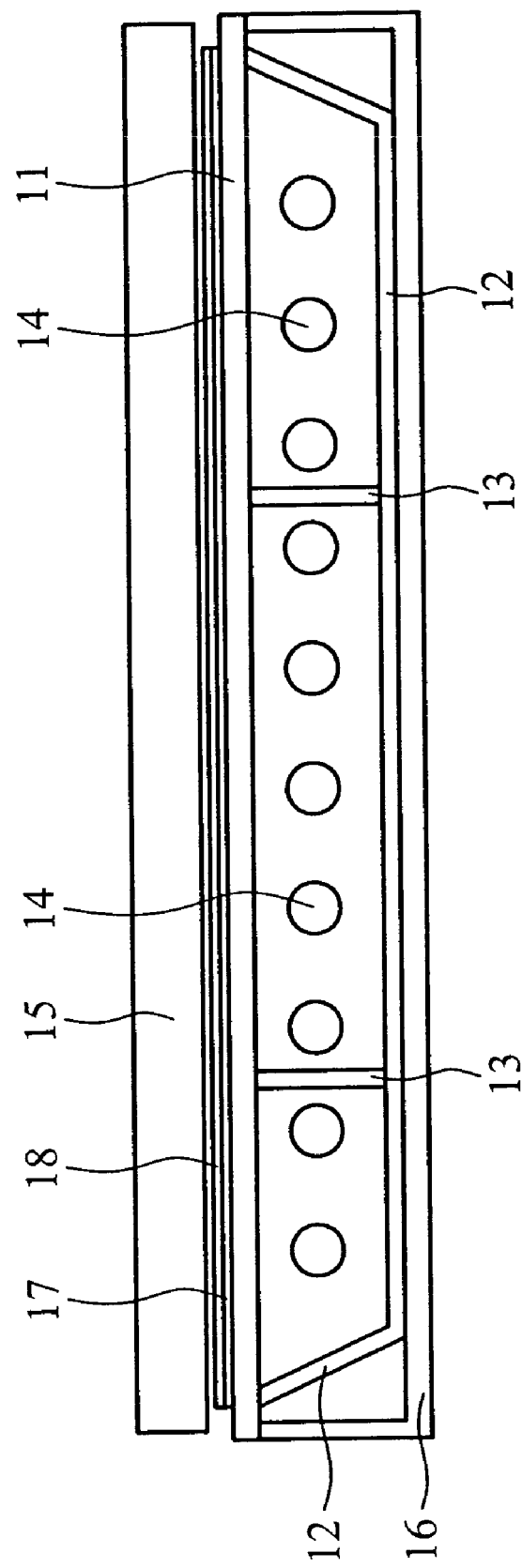
FIG. 1 is a cross section showing a conventional direct backlight module.
Figure 2:
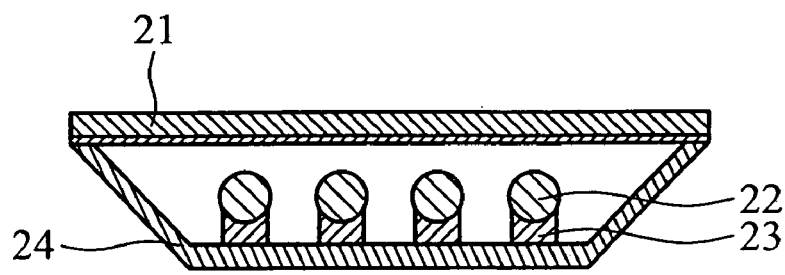
FIG. 2 is a cross section showing another conventional direct backlight module.
Figure 3:
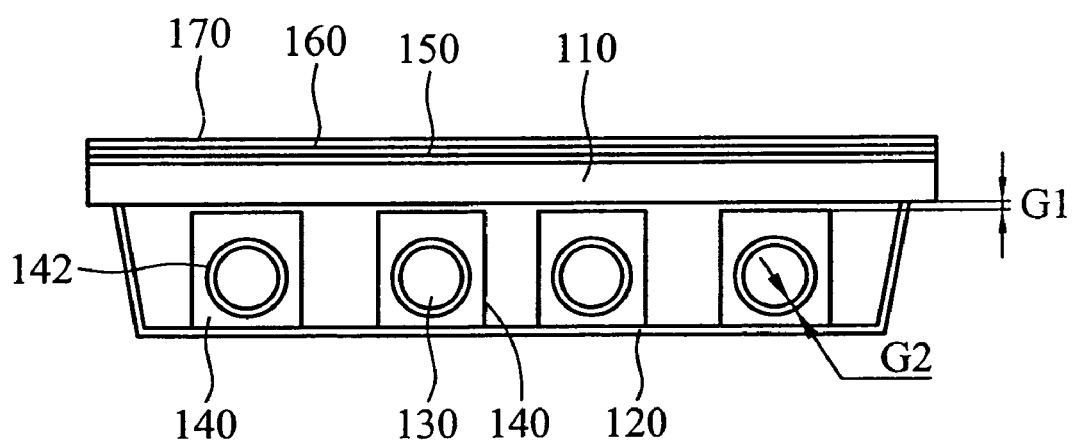
FIG. 3 is a cross section showing the direct backlight module of the invention.
Figure 4:
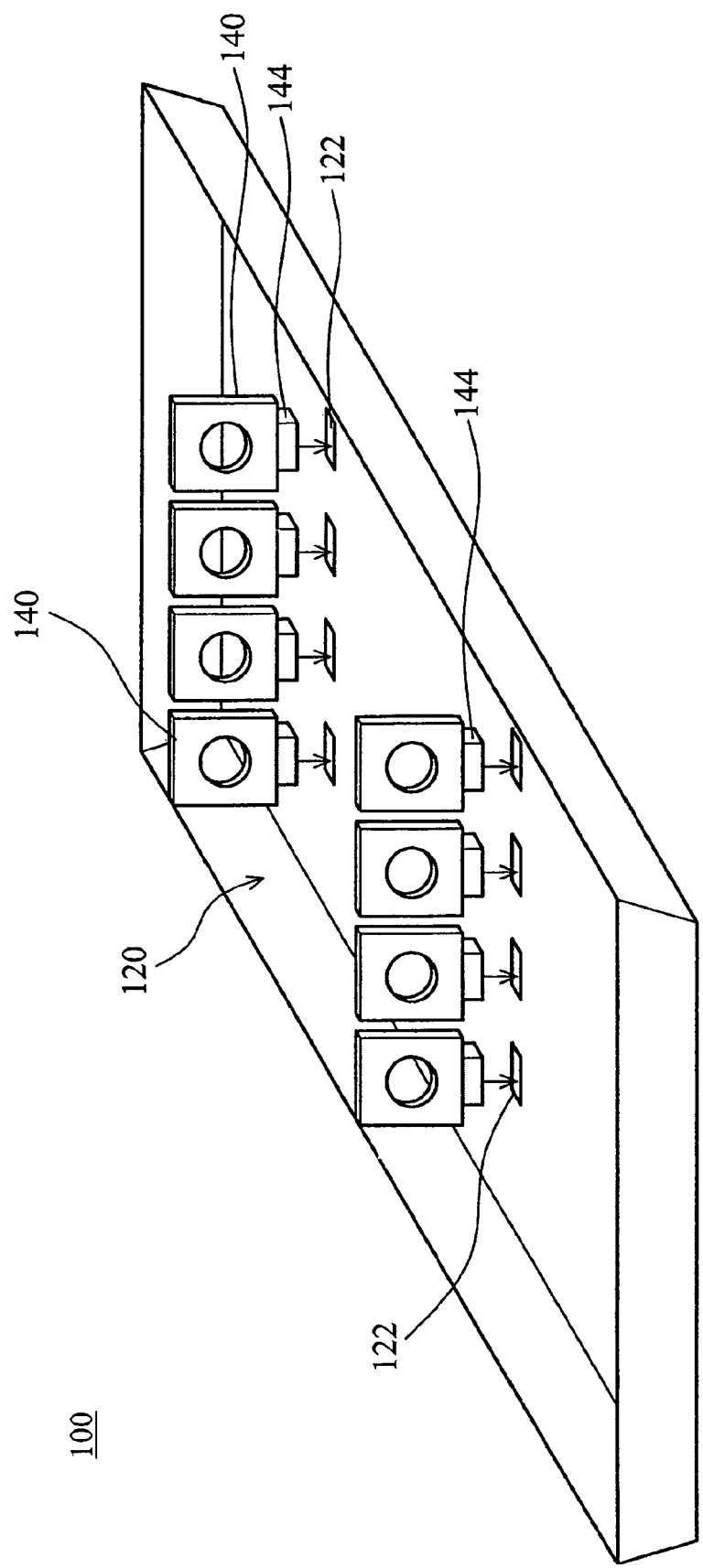
FIG. 4 is a schematic view showing the supports disposed in the direct backlight module of the invention.
Figure 5C:
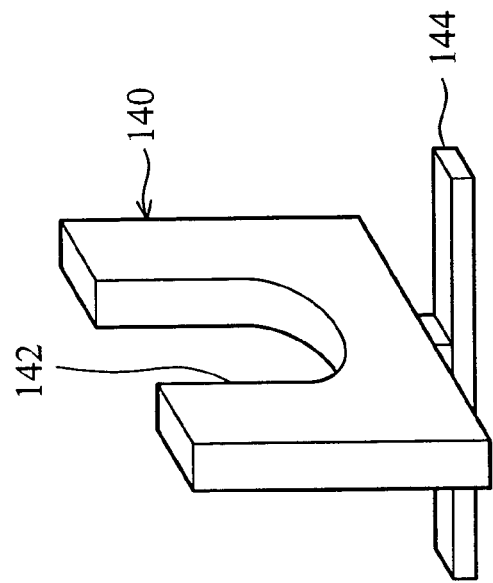
FIGS. 5A, 5B, 5C, 5D, 5E, 5F and 5G show the configurations of the present supports.
Figure 5B:
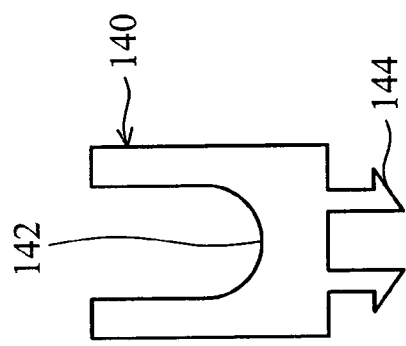
Figure 5A:
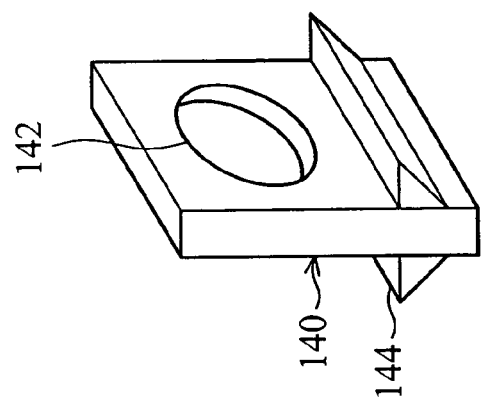
Figure 5F:
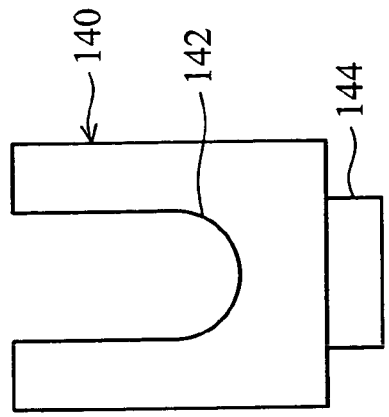
Figure 5E:
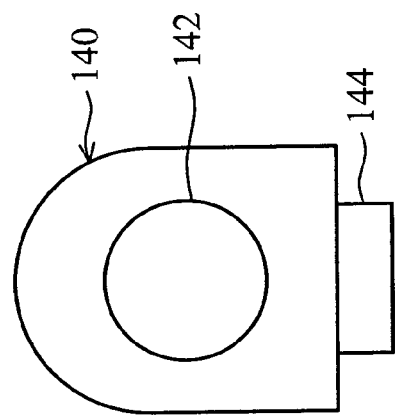
Figure 5D:
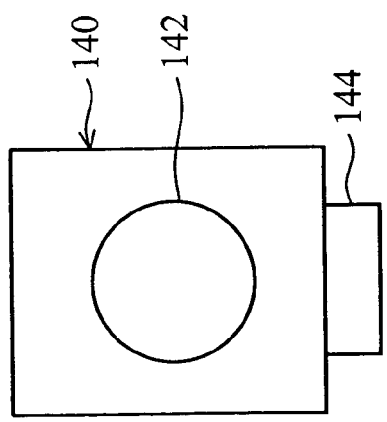
Figure 5G:
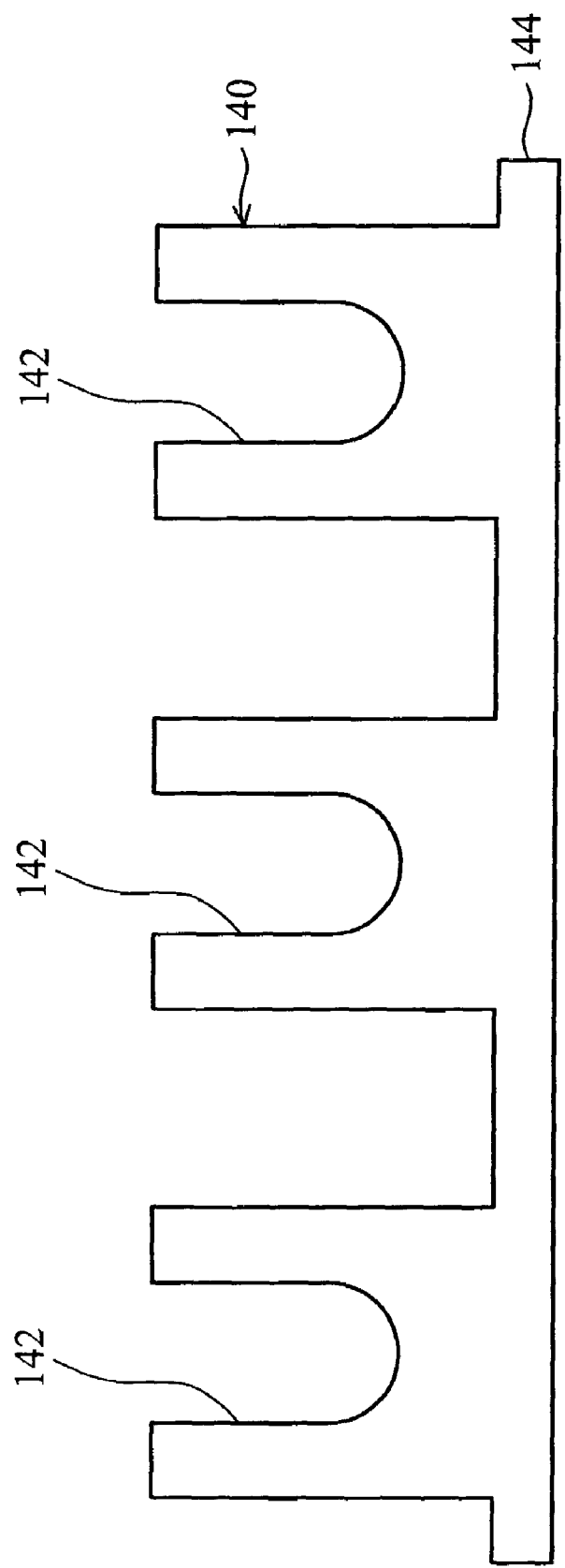

Referring to FIG. 3 and FIG. 4, the direct backlight module 100 comprises a diffuser 110, a reflecting plate 120, an illumination tube 130, a support 140, a first diffusing plate 150, a prism 160 and a second diffusing plate 170.

The first diffusing plate 150, the prism 160 and the second diffusing plate 170 can be added or omitted as required. In addition, the arrangement of the first diffusing plate 150, the prism 160 and the second diffusing plate 170 can be changed as required. In this embodiment, the first diffusing plate 150 is disposed on the diffuser 110. The prism 160 is disposed on the first diffusing plate 150. The second diffusing plate 170 is disposed on the prism 160. The reflecting plate 120 is disposed under the diffuser 110 and the illumination tube 130. The illumination tube 130 is disposed between the diffuser 110 and the reflecting plate 120. The support 140 is disposed on the reflecting plate 120 and between the diffuser 110 and the reflecting plate 120.

As shown in FIG. 3 and FIG. 4, the support 140 supports the diffuser 110 and the illumination tube 130 simultaneously. Additionally, the support 140 has a fitting portion 142 into which the illumination tube 130 directly fits. Thus, the illumination tube 130 is supported by the support 140.

Specifically, a first minor gap G1 exists between the support 140 and the diffuser 110 to protect the diffuser 110 from deformation due to thermal expansion and contraction of the support 140. Nevertheless, the diffuser 110 is in direct contact with the support 140 and supported thereby under normal conditions.

Similarly, a second minor gap G2 exists between the fitting portion 142 of the support 140 and the illumination tube 130 to protect the illumination tube 130 from deformation due to thermal expansion and contraction of the support 140.

In this embodiment, the support 140 is disposed on the reflecting plate 120 and has a rectangular shape. The height of the support 140 is substantially equal to the distance between the diffuser 110 and the reflecting plate 120. The support 140 supports the diffuser 110. Further, the first minor gap G1 between the support 140 and the diffuser 110 protects the diffuser 110 from deformation due to thermal expansion and contraction of the support 140. In addition, the fitting portion 142 is a circular hole for accommodating the illumination tube 130. The diameter of the fitting portion 142 is substantially equal to that of the illumination tube 130. Further, the second minor gap G2 between the fitting portion 142 of the support 140 and the illumination tube 130 protects the illumination tube 130 from deformation due to thermal expansion and contraction of the support 140.

Additionally, the reflecting plate 120 has a groove 122 and the support 140 has an engaging portion 144 formed thereunder, as shown in FIG. 4. The support 140 is fixed onto the reflecting plate 120 by inserting the engaging portion 144 into the groove 122. Then, the engaging portion 144 is securely fixed in the groove 122 by hot glue.

The support 140, the fitting portion 142 and the engaging portion 144 of the invention can have many configurations, and the shape of the groove 122 of the reflecting plate 120 can be changed according to the shape of the engaging portion 144 of the support 140, as shown in FIGS. 5A, 5B, 5C, 5D, 5E, 5F and 5G.

Moreover, the support 140 is made of a material of light weight and high intensity. For example, the support 140 may be made of plastic such as acrylic. Thus, the total weight of the direct backlight module 100 is not significantly increased. While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A direct backlight module, comprising:
   a diffuser;
   a reflecting plate disposed under the diffuser;
   an illumination tube disposed between the diffuser and the reflecting plate; and
   a support disposed between the diffuser and the reflecting plate, the support having a fitting portion, wherein:
   the fitting portion comprises two side walls extending upwardly and separately,
   the illumination tube is disposed in the fitting portion and between the side walls, and
   at least one of the side walls extends toward and beyond the top of the illumination tube for preventing bending of the diffuser.

2. The direct backlight module as claimed in claim 1, wherein a first gap exists between the support and the diffuser to protect the diffuser from deformation due to thermal expansion of the support.

3. The direct backlight module as claimed in claim 1, wherein a second gap exists between the fitting portion of the support and the illumination tube to protect the illumination tube from deformation due to thermal expansion of the support.

4. The direct backlight module as claimed in claim 1, wherein the reflecting plate further comprises a groove and the support further comprises an engaging portion engaged in the groove.

5. The direct backlight module as claimed in claim 1, wherein the support is fixed to the reflecting plate by glue.

6. The direct backlight module as claimed in claim 5, wherein the support is fixed to the reflecting plate by hot glue.

7. The direct backlight module as claimed in claim 1, wherein the fitting portion of the support is a circular hole.

8. The direct backlight module as claimed in claim 1, wherein the fitting portion of the support is a U-shaped recess.

9. The direct backlight module as claimed in claim 1, wherein the support has a substantially rectangular shape.

10. The direct backlight module as claimed in claim 1, wherein the support has a substantially polygonal shape.

11. The direct backlight module as claimed in claim 1, wherein the support has a substantially curved shape.

12. The direct backlight module as claimed in claim 1, wherein the support is made of plastic.

13. The direct backlight module as claimed in claim 1, further comprising a diffusing plate disposed on the diffuser.

14. The direct backlight module as claimed in claim 1, further comprising a prism disposed on the diffuser.

15. The direct backlight module as claimed in claim 13, further comprising a prism disposed on the diffusing plate.

16. A direct backlight module, comprising:
    a diffuser;
    a reflecting plate disposed under the diffuser;
    an illumination tube disposed between the diffuser and the reflecting plate; and
    a support disposed between the diffuser and the reflecting plate, the support having a fitting portion, wherein:
    the fitting portion has two side walls extending upwardly and separately,
    the illumination tube is disposed in the fitting portion and between the side walls, and
    at least one of the side walls extends toward and beyond the top of the illumination tube for preventing bending of the diffuser.

17. The direct backlight module as claimed in claim 1, wherein the side walls are connected to each other after extending beyond the top of the illumination tube.

18. The direct backlight module as claimed in claim 16, wherein the side walls are connected to each other after extending beyond the top of the illumination tube.

* * * * *